United States Patent [19]

Geraci et al.

[11] Patent Number: 5,421,117
[45] Date of Patent: Jun. 6, 1995

[54] CARRIER, TRANSPORT, AND STORAGE DEVICE

[75] Inventors: Gary E. Geraci, 8407 Bandera Rd., #133-197, San Antonio, Tex. 78250; Arthur G. Peterson, San Antonio, Tex.

[73] Assignee: Gary E. Geraci, San Antonio, Tex.

[21] Appl. No.: 204,585

[22] Filed: Mar. 2, 1994

[51] Int. Cl.$^6$ .................. A01K 87/02; A01K 97/10
[52] U.S. Cl. .................. 43/21.2; 43/25; 224/922
[58] Field of Search ............ 43/21.2, 25, 23, 54.1; 248/220.3, 220.4, 221.1, 221.2; 224/922

[56] References Cited

U.S. PATENT DOCUMENTS

| | | | |
|---|---|---|---|
| 2,614,701 | 10/1952 | Mapson | 248/220.4 |
| 3,036,398 | 5/1962 | Gagner | 43/25.2 |
| 3,319,910 | 5/1967 | Collin . | |
| 3,832,796 | 9/1974 | Cardwell | 43/25 |
| 3,992,799 | 11/1976 | Oakes | 43/25 |
| 4,094,415 | 6/1978 | Larson | 248/220.3 |
| 4,265,046 | 5/1981 | Keith | 43/25 |
| 4,531,697 | 7/1985 | Steiner | 248/221.2 |
| 4,768,303 | 9/1988 | Baylink . | |

Primary Examiner—P. Austin Bradley
Assistant Examiner—James Miner

[57] ABSTRACT

An inexpensive carrier, transport, and storage device (40), (50) for the securing of fishing pole segments (12), (14) in such a way as to separate the segments for convenience of transportation and storage without derigging the pole. The main body member coupling (41) and female coupling end (44) of the clip device are made of a material conducive for gripping during a frictional engagement and tapered and leveled so as to firmly telescopically grip and hold pole segment ferrule portions (30), (32). Pole segments (12), (14) are aligned so that mounted line guides (15), (17) and fishing line (22) face inward. Space (24) is filled by suspending clip device (40) over protruding support (56) of storage rack (50).

3 Claims, 2 Drawing Sheets

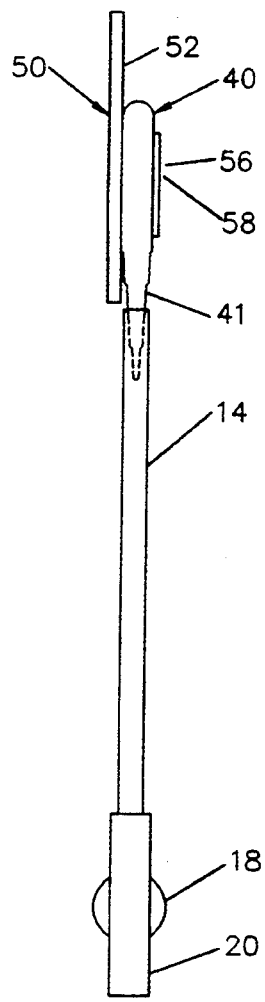
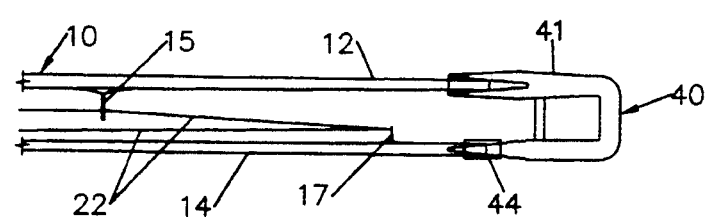
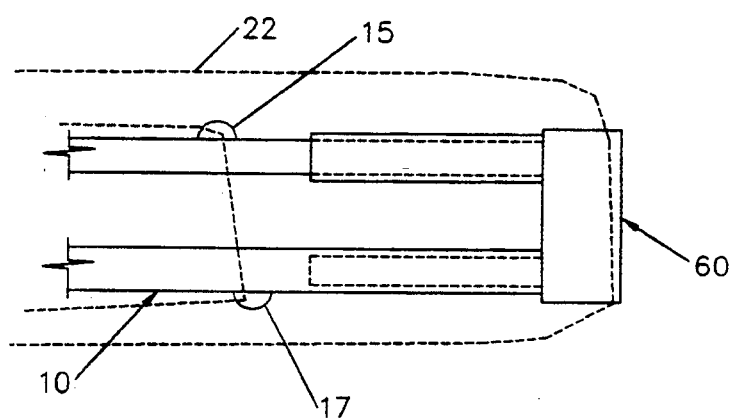
FIGURE 6
FIGURE 7A
FIGURE 7B
PRIOR ART

CARRIER, TRANSPORT, AND STORAGE DEVICE

BACKGROUND—FIELD OF INVENTION

This invention relates to devices for securing together, transporting, and storing the segments of a fully rigged fishing pole after it has been temporarily broken down for transport or storage.

BACKGROUND—DESCRIPTION OF PRIOR ART

Fishing poles of any length are usually made in two or more segments joined by ferrules. When a pole is not in use, the segments can be separated so that the pole can be more conveniently stored or transported. When the pole is in use, fishing line extends through line guides on the pole segments. Fishing tackle, including a hook and other equipment, such as swivels, leaders, lures and bait are attached to the free end of the line. Before a pole can be broken down for storage, it is necessary to disconnect such tackle, which would otherwise become entangled in the separated pole segments. Once the tackle is removed, the line is fully reeled in, likewise to avoid tangling. Because it takes considerable time to rig a fishing pole, i.e. to thread the fishing line through the line guides and attach tackle at the free end, it is very inconvenient to separate the pole segments if the user intends to carry the pole only a short distance, or store it for a short period of time. There is thus a need for a way to separate the segments for convenience of transportation and storage without derigging the pole. Thereafter, inventors created several types of devices to secure together the segments of a fishing pole is such a way as to separate the segments for convenience of transportation and storage without derigging the pole. U.S. Pat. Nos. 4,768,303 to Baylink (1988) and U.S. Pat. No. 3,319,910 to Collin (1966) show devices which allow fishing pole segments to be transported side by side without derigging; however, the user of these devices must first take the time to loosen the line, pull it out and over the device, and then remove the device. U.S. Pat. No. 4,768,303 to Baylink (1988) tries to solve this inconvenience by referring to a complex hinged embodiment of the device which need not be removed when the pole is in use. To operate the hinge according to Baylink would still require additional steps and time. Furthermore, the rigidness of the hinge in its extended position, regardless of material selection, would noticeably impair the action of the pole hence reducing the enjoyment of the fishing process. More importantly, with or without the hinge embodiment, both aforementioned prior-art patent devices leave the fishing line exposed to a greater risk of snags by facing the mounted line guides and fishing line outward where they could easily become snagged or tangled during transport. U.S. Pat. No. 3,319,910 to Collin (1966) provides the device with a means for displaying the pole components by suspension from a supporting wall or rack; however the main body of the device supports an opening that is round which would entail the use of an additional rack located below the primary support so as to prevent wobbling and play during storage or display. The device also reference to a small flat area of the device that could also be used as a suspension point; however, the small protruding support element that would have to extend through this small opening would have to be designed in such a way as to include additional fastening elements in order to firmly secure a tight wobble free fit without having to use an additional rack located below the primary rack.

OBJECTS AND ADVANTAGES

Accordingly, several objects and advantages of the present invention are:
(a) To provide a clip device which allows the pole segments to be stored alongside one another in generally parallel alignment without derigging the pole.
(b) To provide a clip device which will hold the pole segments in a fixed side-by-side relationship for convenience in handling, storing and the like.
(c) To provide a clip device which allows fishing pole segments to be conveniently stored side-by-side with the mounted line guides and fishing line facing inward, thus greatly reducing the risk of snagging or tangling incident to traveling through wooded areas such as from one fishing area to another.
(d) To provide a clip device that eliminates the need for a grooved top surface and the extra steps of loosening and pulling the line out and over the device before reassembling the pole segments.
(e) To provide a clip device with means for storing the pole components by suspension from a supporting wall or rack.
(f) To provide a clip device which is simple to use and easy to manufacture.
(g) To provide a clip device that will universally secure the varying dimensions of:
  1.) freshwater pole segments.
  2.) saltwater pole segments.
(h) To provide a clip device with a companion storage rack that is designed to accept such a clip as to insure a snug and wobble free fit.

Still further objects and advantages will become apparent from a consideration of the ensuing description and drawings.

DRAWING FIGURES

In the drawings:
FIG. 1 is a side elevational view of a fully rigged fishing pole that comprises two segments held in side-by-side relationship by a clip device according to the present invention;
FIG. 2 is an enlarged, isometric view of the clip device;
FIG. 3 is a sectional end view of FIG. 2;
FIG. 4 is a view similar to FIG. 2 showing a modified form of the invention;
FIG. 5 is an isometric view of a storage rack with protruding support elements.
FIG. 6 is a clip device with fishing pole suspended from the storage rack.
FIG. 7-A/7-B is a view of this invention and it's improvement over prior-art.

REFERENCE NUMERALS IN DRAWINGS 10 fishing pole
12 male pole segment
14 female pole segment
15 mounted line guides
16 tip line guide
17 mounted line guides
18 fishing reel
20 butt end of fishing pole
22 fishing line 24 inner space shape
30 male ferrule portion
32 female ferrule portion
40 clip device
41 main body member coupling
41(a) modification of main body member coupling
42 tapered and leveled section
43 horizontal structural support strut
44 female coupling end
44(a) modification of female coupling
50 storage rack
52 wall mount plate
54 screw holes
55 wood screws
56 protruding support element
58 retaining lip plate
60 prior-art connector apparatus

DETAILED DESCRIPTION AND OPERATION OF INVENTION

Figure 1:
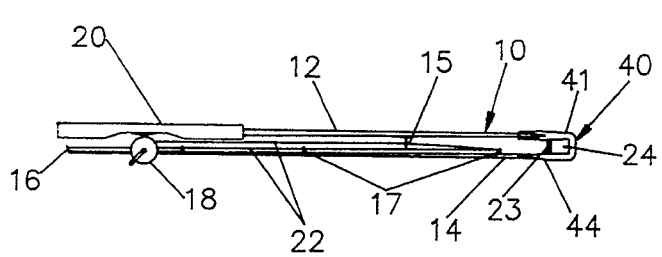
Figure 2:
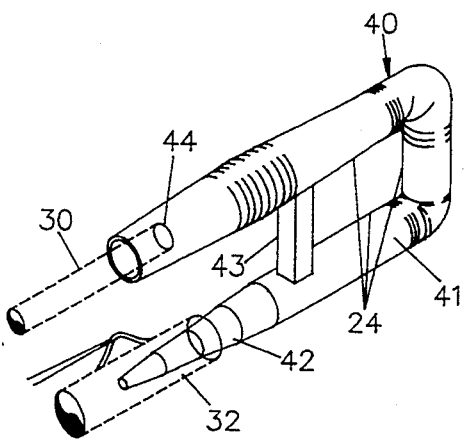
Figure 3:
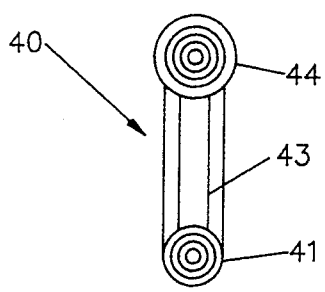

FIG. 1 and FIG. 2 shows a fishing pole 10, which is a pole comprising two pole segments 12, 14 on which are mounted line guides 15, 17. A fishing reel 18 is mounted near a butt end 20. Fish line 22 extends from reel 18 through line guides 15, 17, through and over tip line guide 16, and hook or swivel fastened to line guide 17 or 15. During normal usage, pole segments 12, 14 are joined by means of a ferrule. Specifically, at a connection end of segment 14 is a female portion 32 of the ferrule which receives male portion 30 located at a connection end of pole segment 12. Female portion 32 is slightly flared and male portion 30 is tapered at the same angle to provide a tight frictional fit. Different poles and portions of poles will have ferrules of different diameters and taper angles, depending on the manufacturer and pole size. When it is desired to move the pole for more than a short distance or to place it in a vehicle, the two ferrule portions are separated and the pole segments placed side-by-side for easier handling. In order to accomplish this task, without intolerable tangling of the fishing tackle, it is necessary to remove the tackle from the line 22 and reel the line in completely onto reel 18. By using a transport and storage clip device according to the present invention, placing the segments in side-by-side relationship is a much easier process. In one embodiment, shown in FIGS. 1 and 2, a lightweight inexpensive clip device 40 comprises a male coupling 41 which is tapered and leveled 42 to be received by female portion 32 of the ferrule, and a female coupling 44 internally tapered to receive male portion 30 of the ferrule. A connection element connects the male coupling and the female coupling. The connection element extends from the male coupling to the female coupling in a cylindrical and uninterrupted manner. Male coupling 41 and coupling 44 are spaced apart and aligned in such an orientation that each extends in substantially the same direction and in substantially parallel alignment. Male coupling 41 and coupling 44 join together to form inner space shape 24 for suspension over a protruding support during storage. Horizontal structural support strut 43 is used to provide rigidity between couplings 41, 44 and to ensure the continuity of inner space shape 24. To use clip device 40, one separates ferrule portions 30, 32 and pushes them into engagement with coupling 44 and male coupling 41 respectively. As shown in FIG. 3, by means of frictional telescopic engagement, a firm hold is achieved. FIG. 7-A shows clip device 40 and a comparison of how its hold creates a new result over the prior-art invention U.S. Pat. No. 4,768,303 to Baylink 60, FIG. 7-B. An improvement will be found in the way line guides 15, 17 of segments 12, 14 extend inwardly facing each other so as to keep line 22 facing towards the inside so as to prevent accidental snagging during transport.

Figure 4:
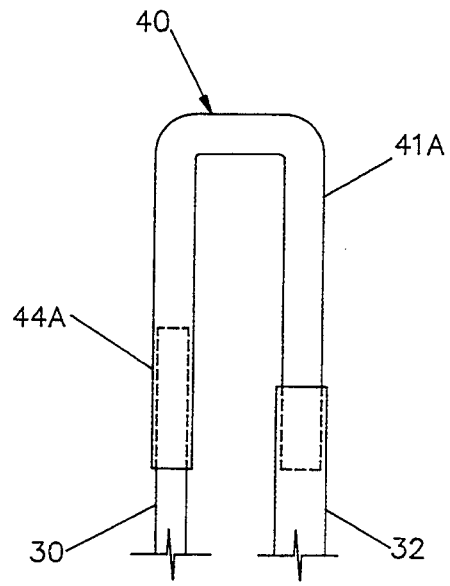
Figure 5:
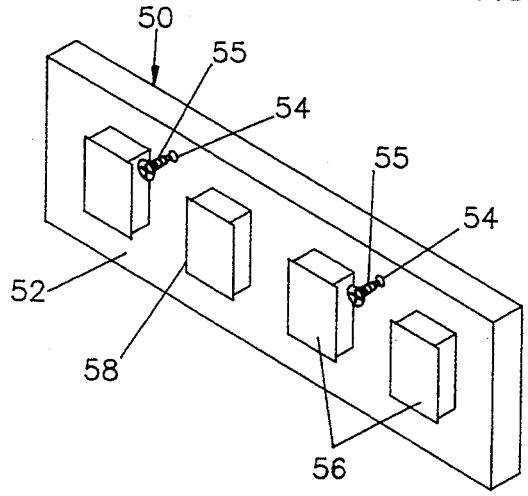

When pole segments 12, 14 are moved from the extended to the folded position, the user may then wind reel 18 to take up any slack in line 22. The distal end of the fishing line and any associated tackle are secured to the pole at any convenient position, usually by engaging a hook with a convenient attachment point on the pole. Depending on the length of the leader, the attachment point could be line guide 15, 17 on either of the segments 12, 14, a special eyelet near reel 18, a cork hand grip portion, or a part of the reel. In the modification shown in FIG. 4, the bottom of main body member coupling 41(a) is of uniform diameter throughout its length substantially matching the inside diameter of female portion 32 for firm frictional engagement therewith. The companion female coupling 44(b) is of hollow tubular form of uniform inside diameter substantially matching the outside diameter of the male portion 30 for firm frictional engagement therewith. From the foregoing it will be readily apparent that disassembled fishing pole sections can be reassembled and held in parallel relation to each other for transportation, storage or display purposes in compact form and of a length equal to that of only one section. FIG. 5 shows a storage rack 50 which utilizes a flat wall mount plate 52 as its foundation. Plate 52 would be affixed to a flat vertical surface by inserting wood screws 55 through screw holes 54 and into flat vertical surface. As shown in FIG. 6, one or a number of protruding supports 56 would extend from plate 52 and be substantially shaped and matched so as to snugly receive space 24 of clip device 40 with pole 10 attached. Retaining lip plate 58 would keep clip device 40 from sliding off of protruding support 56 when in storage.

CONCLUSION, RAMIFICATIONS, AND SCOPE OF INVENTION

Accordingly, the reader will see that the carrier, transport, and storage device of this invention can be used to effectively reassemble segments of a fishing pole in parallel relation to each other in compact form for convenience in handling, storing, and the like. Because the fishing line and mounted line guides face inward, the likelihood of snags or tangles during travel or storage are greatly reduced. In addition, one merely needs to remove the clip device and rejoin the segments of the pole in two easy steps. Storing and display can be accomplished without wobble and play by utilizing the storage rack and clip device in combination. Although the description above contains many specificities, these should not be construed as limiting the scope of the invention but as merely providing illustrations of some of the presently preferred embodiments of this invention. For example, the main body member coupling of the clip device along with the matching storage rack supports could provide other shapes, such as half octagon, triangular, trapezoidal, etc.; the female coupling end could be made part of the main body member coupling with a separate male coupling end attached to the main body member coupling; clip devices according to the present invention could be used to join elongated objects other than fishing pole segments. Thus the scope of the invention should be determined by the appended claims and their legal equivalents, rather than by the examples given.

We claim:

1. A carrier for sections of a fishing pole, said carrier comprising:

a male coupling and a female coupling, each of said couplings comprising a first end and a second end, a connection means attached to said first end of said male coupling and said first end of said female coupling, said connection means linearly extending from said first end of said male coupling to said first end of said female coupling in cylindrical and uninterrupted fashion, said second end of said male coupling comprising male coupling means for providing a firm, frictional grip with an interior of a female connection end ferrule portion of the fishing pole, said male coupling means further comprising a tapered portion, said second end of said female coupling comprising female coupling means for providing a firm, frictional grip with an exterior of a male connection end ferrule portion of the fishing pole, said carrier further comprising a support element connecting said male coupling and said female coupling.

2. A carrier for sections of a fishing pole as set forth in claim 1, wherein said connection means, said support element, said male coupling and said female coupling are spaced so as to create an interior space, said interior space for receiving a protruding support for supporting said carrier.

3. A carrier for sections of a fishing pole as set forth in claim 1, wherein said male and female couplings are spaced apart and aligned in parallel relation to one another.

* * * * *